United States Patent
Jeon et al.

(10) Patent No.: US 12,003,519 B2
(45) Date of Patent: Jun. 4, 2024

(54) CYBER-PHYSICAL SYSTEM FOR DETECTING POLE-DYNAMICS ATTACK

(71) Applicant: DAEGU GYEONGBUK INSTITUTE OF SCIENCE AND TECHNOLOGY, Daegu (KR)

(72) Inventors: Heegyun Jeon, Daegu (KR); Yongsoon Eun, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 391 days.

(21) Appl. No.: 17/477,835

(22) Filed: Sep. 17, 2021

(65) Prior Publication Data

US 2022/0159017 A1 May 19, 2022

(30) Foreign Application Priority Data

Nov. 19, 2020 (KR) .................. 10-2020-0155963

(51) Int. Cl.
 *H04L 9/40* (2022.01)
(52) U.S. Cl.
 CPC ...... *H04L 63/1416* (2013.01); *H04L 63/0876* (2013.01); *H04L 63/1425* (2013.01); *H04L 63/1483* (2013.01)
(58) Field of Classification Search
 CPC ............. H04L 63/0876; H04L 63/1416; H04L 63/1425; H04L 63/1483; H04L 63/162; H04K 3/22; H04K 3/65
 See application file for complete search history.

(56) References Cited

U.S. PATENT DOCUMENTS

| 2017/0357829 | A1* | 12/2017 | Park | G06F 21/86 |
| 2020/0106788 | A1* | 4/2020 | Chen | G06N 3/047 |
| 2020/0169574 | A1* | 5/2020 | Yan | G06F 21/552 |

FOREIGN PATENT DOCUMENTS

KR 10-2017-0141110 A 12/2017

OTHER PUBLICATIONS

Yan, Weizhong, Lalit K. Mestha, and Masoud Abbaszadeh. "Attack detection for securing cyber physical systems." IEEE Internet of Things Journal 6.5: 8471-8481. (Year: 2019).*
Cao, Liwei, et al. "A survey of network attacks on cyber-physical systems." IEEE Access 8: 44219-44227. (Year: 2020).*
Jeon, Heegyun, and Yongsoon Eun. "A stealthy sensor attack for uncertain cyber-physical systems." IEEE Internet of Things Journal 6.4: 6345-6352. (Year: 2019).*

(Continued)

*Primary Examiner* — John M Macilwinen
(74) *Attorney, Agent, or Firm* — Pearne & Gordon LLP (57) ABSTRACT

Disclosed is a cyber-physical system for detecting a pole-dynamics attack, including an attack detector configured to receive a sensor signal output from a physical system and to output an attack detection signal based on the received sensor signal, and a mode controller configured to receive the sensor signal and to output an input control signal for controlling the physical system based on the received sensor signal, wherein the mode controller controls a normal control (NC) mode and an attack detection control (ADC) mode for detecting pole-dynamics attack (PDA) from an output to be repeatedly executed at a preset switching period.

10 Claims, 7 Drawing Sheets

(56) References Cited

OTHER PUBLICATIONS

Tan, Sen, et al. "Brief survey on attack detection methods for cyber-physical systems." IEEE Systems Journal 14.4: 5329-5339. (Year: 2020).*

Sridhar, Siddharth, and Manimaran Govindarasu. "Model-based attack detection and mitigation for automatic generation control." IEEE Transactions on Smart Grid 5.2: 580-591. (Year: 2014).*

Al-Abassi, Abdulrahman, et al. "An ensemble deep learning-based cyber-attack detection in industrial control system." IEEE Access 8: 83965-83973. (Year: 2020).*

Hoehn, Andreas, and Ping Zhang. "Detection of covert attacks and zero dynamics attacks in cyber-physical systems." 2016 American Control Conference (ACC). IEEE. (Year: 2016).*

C. Kwon et al. "Security Analysis for Cyber-Physical Systems against Stealthy Deception Attacks" 2013 American Control Conference (ACC) Washington, DC, USA, Jun. 17-19, 2013.

H. Jeon et al. "A Stealthy Sensor Attack for Uncertain Cyber-Physical Systems" IEEE Internet of Things Journal, vol. 6, No. 4, Aug. 2019.

A. Teixeira et al. "Distributed Fault Detection and Isolation Resilient to Network Model Uncertainties" IEEE Transactions on Cybernetics, vol. 44, No. 11, Nov. 2014.

A. Teixeira et al. "A secure control framework for resource-limited adversaries" Automatica 51 (2015) 135-148.

Y. Mo et al. "False data injection attacks in control systems" ResearchGate, Article, published Jan. 2010.

Jeon, H. "Resilient Control Systems Design Under Malicious Sensor Attacks." Doctoral Thesis, Department of Information and Communication Engineering, DGIST (2020).

Korean Office Action dated Nov. 24, 2021 issued in corresponding Korean Appln. No. 10-2020-155963.

* cited by examiner

【FIG. 4H】

CYBER-PHYSICAL SYSTEM FOR DETECTING POLE-DYNAMICS ATTACK

CROSS-REFERENCE TO RELATED APPLICATION

This application claims priority to and the benefit of Korean Patent Application No. 10-2020-0155963, filed on Nov. 19, 2020, the disclosure of which is incorporated herein by reference in its entirety.

BACKGROUND OF THE INVENTION

1. Field of the Invention

The present disclosure relates to a cyber-physical system, and more particularly to a technical idea for detecting a pole-dynamics attack in a cyber-physical system.

2. Description of the Related Art

Due to remarkable advances and leaps in computing devices, embedded systems, networks, and communication technologies, an issue of a cyber-physical system (CPS) configured by tightly integrating technologies of physical and cyber entities has rapidly emerged in recent years.

Introduction of the cyber-physical system realizes a more advanced control system, and for example, establishes important infrastructure in a downtown area and realizes smart cars and ships, but issues in terms of risk and security for system errors and cyber-attacks due to integration of technologies of entities have emerged together. In reality, there have been reports of damage to nuclear facilities, military drones, and furnace control systems as a result of malicious attacks.

In a control system community, various types of attacks on a cyber-physical system have been reported. Such an attack causes malfunction of the cyber-physical system by infiltrating the cyber-physical system through a network and altering a sensor measurement value and a control input value transmitted between a physical system and a controller.

The most important aspect of the reported attacks is stealth, which means that an attack effect is not revealed in an anomaly detection signal of an attack detection device and thus the attack is not detected. In order to achieve stealth, an attacker requires real-time eavesdropping of model information or control input and sensor measurement data from the cyber-physical system.

A pole-dynamics attack (PDA) refers to a sensor attack with high stealth that targets a linear physical system with an unstable pole.

A strategy of the pole-dynamics attack is to trick an unstable physical system into appearing to be stable by injecting false data into a sensor measurement value transmitted over a network. As a result, the controller and the attack detection device fail to receive any information on an unstable operation of the physical system, to stabilize the cyber-physical system, and to detect the attack.

Therefore, it is necessary to easily detect and respond to a pole-dynamics attack in order to prevent malfunction of the cyber-physical system, but there has been no known technology for easily detecting such a pole-dynamics attack until now.

CITED REFERENCE

Patent Document

Korean Patent Publication No. 10-2017-0141110, "Integrated Circuit, Mobile Device including the same, and Method of Preventing Hacking thereof"

SUMMARY OF THE INVENTION

Therefore, the present disclosure has been made in view of the above problems, and it is an object of the present disclosure to provide a cyber-physical system for successfully detecting a pole-dynamics attack, which was not capable of being detected until now, by executing multiple control modes.

It is another object of the present disclosure to provide a cyber-physical system for establishing a stable control environment by detecting the pole-dynamics attack in real time.

In accordance with an aspect of the present disclosure, the above and other objects can be accomplished by the provision of a cyber-physical system including: an attack detector configured to receive a sensor signal output from a physical system and to output an attack detection signal based on the received sensor signal; and a mode controller configured to receive the sensor signal and to output an input control signal for controlling the physical system based on the received sensor signal, wherein the mode controller controls a normal control (NC) mode and an attack detection control (ADC) mode for detecting a pole-dynamics attack (PDA) from an output to be repeatedly executed at a preset switching period.

In accordance with an aspect, the cyber-physical system may further include a secret entity provided on a feedback line connecting an input end and an output end of the physical system and activated in the ADC mode.

In accordance with an aspect, the secret entity may receive the sensor signal and may output a control input signal obtained by performing calculation of a predetermined design coefficient on the received sensor signal.

In accordance with an aspect, the attack detector may determine whether there is an attack on or error in the physical system by comparing the attack detection signal with a preset attack detection threshold and may determine stability of the physical system by comparing a preset state variable with a preset safety determination threshold in response to the physical system.

In accordance with an aspect, the mode controller may control at least one of a switching period of the NC mode and a switching period of the ADC mode.

In accordance with an aspect, the mode controller may control the switching period of the NC mode based on a maximum value of the switching period of the NC mode that is inversely proportional to a preset safety determination threshold.

In accordance with an aspect, the mode controller may control the switching period of the NC mode based on a maximum value of the switching period of the NC mode that is calculated through Expression 1 below:

$$T = \frac{1}{\lambda_u} \ln\left(\frac{\|C\|M}{v_u \delta}\right) \quad \text{[Expression 1]}$$

where T is a maximum value of the switching period of the NC mode, $v_u$ and $\lambda_u$ are constants satisfying a condition $\|e^{At}\| \leq v_u e^{\lambda_u t}$, δ is an attack detection threshold, M is a safety determination threshold, and A and C are system matrices constituting a linear model corresponding to the physical system.

In accordance with an aspect, the mode controller may control the switching period of the ADC mode based on a minimum value of the switching period of the ADC mode that is inversely proportional to a preset design coefficient of the secret entity.

In accordance with an aspect, the mode controller may control the switching period of the ADC mode based on a minimum value of the switching period of the ADC mode calculated using Expression 2 below:

$$\underline{T} = \frac{1}{\lambda_u} \ln\left(1 + \frac{\lambda_{d,2} + \lambda_u}{v_{d,2} v_u \|BFC\|}\right) < T_2 \quad \text{[Expression 2]}$$

where $\underline{T}$ is a minimum value of the switching period of the ADC mode, $v_u$, $\lambda_u$, $v_{d,2}$, and $\lambda_{d,2}$ are constants satisfying $\|e^{At}\| \leq v_u e^{\lambda_u t}$ and $\|e^{A_{d,2}t}\| \leq v_{d,2} e^{-\lambda_{d,2} t}$ is a design coefficient, and B and C are system matrices constituting a linear model corresponding to the physical system.

In accordance with an aspect, the mode controller may control the switching period of the NC mode and the switching period of the ADC mode to satisfy Expression 3 below:

$$T_2 > \frac{1}{\lambda_2}(\ln(v_1 \ v_2) - \lambda_1 T_1) \quad \text{[Expression 3]}$$

where $T_1$ is the switching period of the NC mode, $T_2$ is the switching period of the ADC mode, and $v_i$ and $\lambda_i$ (i being 1 or 2) are constants satisfying a condition $\|e^{A_i t}\| \leq v_i e^{-\lambda_i t}$.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE INVENTION

The present disclosure will now be described more fully with reference to the accompanying drawings, in which exemplary embodiments of the disclosure are shown.

This disclosure, however, should not be construed as limited to the exemplary embodiments and terms used in the exemplary embodiments, and should be understood as including various modifications, equivalents, and substituents of the exemplary embodiments.

Preferred embodiments of the present disclosure are now described more fully with reference to the accompanying drawings. In the description of embodiments of the present disclosure, certain detailed explanations of related known functions or constructions are omitted when it is deemed that they may unnecessarily obscure the essence of the disclosure.

In addition, the terms used in the specification are defined in consideration of functions used in the present disclosure, and can be changed according to the intent or conventionally used methods of clients, operators, and users. Accordingly, definitions of the terms should be understood on the basis of the entire description of the present specification.

In the drawings, like reference numerals in the drawings denote like elements.

As used herein, the singular forms "a," "an" and "the" are intended to include the plural forms as well, unless context clearly indicates otherwise.

Expressions such as "A or B" and "at least one of A and/or B" should be understood to include all possible combinations of listed items.

Expressions such as "a first," "the first," "a second" and "the second" may qualify corresponding components irrespective of order or importance and may be only used to distinguish one component from another component without being limited to the corresponding components.

In the case in which a (e.g., first) component is referred as "(functionally or communicatively) connected" or "attached" to another (e.g., second) component, the first component may be directly connected to the second component or may be connected to the second component via another component (e.g., third component).

In the specification, the expression " . . . configured to . . . (or set to)" may be used interchangeably, for example, with expressions, such as " . . . suitable for . . . ," " . . . having ability to . . . ," " . . . modified to . . . ," " . . . manufactured to . . . ," " . . . enabling to . . . ," or " . . . designed to . . . ," in the case of hardware or software depending upon situations.

In any situation, the expression "a device configured to . . . " may refer to a device configured to operate "with another device or component."

For examples, the expression "a processor configured (or set) to execute A, B, and C" may refer to a specific processor performing a corresponding operation (e.g., embedded processor), or a general-purpose processor (e.g., CPU or application processor) executing one or more software programs stored in a memory device to perform corresponding operations.

In addition, the expression "or" means "inclusive or" rather than "exclusive or".

That is, unless otherwise mentioned or clearly inferred from context, the expression "x uses a or b" means any one of natural inclusive permutations.

In the aforementioned embodiments, constituents of the present disclosure were expressed in a singular or plural form depending upon embodiments thereof.

However, the singular or plural expressions should be understood to be suitably selected depending upon a suggested situation for convenience of description, and the aforementioned embodiments should be understood not to be limited to the disclosed singular or plural forms. In other words, it should be understood that plural constituents may be a singular constituent or a singular constituent may be plural constituents.

While the embodiments of the present disclosure have been described, those skilled in the art will appreciate that many modifications and changes can be made to the present disclosure without departing from the spirit and essential characteristics of the present disclosure.

Therefore, it should be understood that there is no intent to limit the disclosure to the embodiments disclosed, rather, the disclosure is to cover all modifications, equivalents, and alternatives falling within the spirit and scope of the disclosure as defined by the claims.

Figure 1:
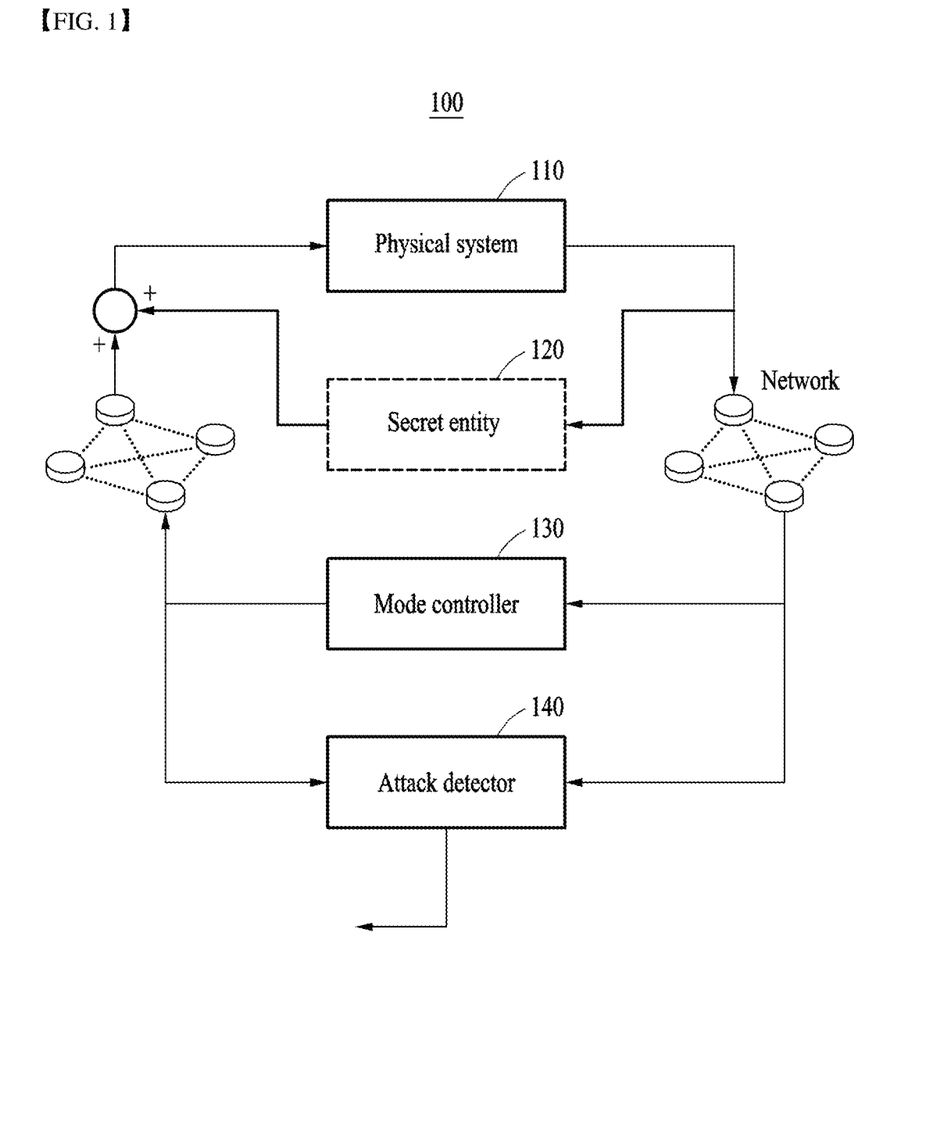
FIG. 1 is a diagram for explaining a cyber-physical system according to an embodiment.

FIG. 1 is a diagram for explaining a cyber-physical system according to an embodiment.

Referring to FIG. 1, a cyber-physical system 100 according to an embodiment may successfully detect a pole-dynamics attack, which is not capable of being detected until now, by executing multiple control modes.

The cyber-physical system 100 may establish a stable control environment by detecting the pole-dynamics attack in real time.

To this end, the cyber-physical system 100 may include a secret entity 120, a mode controller 130, and an attack detector 140.

The attack detector 140 according to an embodiment may receive a sensor signal output from a physical system 110 and may output an attack detection signal r(t) based on the received sensor signal $\tilde{y}(t)$.

In detail, the physical system 110 may receive a control input signal u(t) and may output a sensor signal y(t) through a network, the attack detector 140 may receive a sensor signal $\tilde{y}(t)$ transferred through the network, and here, the sensor signal $\tilde{y}(t)$ transferred through the network may include an attack signal a(t).

In other words, $\tilde{y}(t)=y(t)$ may be satisfied when there is no sensor attack, but $\tilde{y}(t) \neq y(t)$ may be established based on $\tilde{y}(t)=y(t)+a(t)$ when there is a sensor attack.

According to an aspect, the attack detector 140 may determine whether there is an attack or error on the physical system 110 by comparing an attack detection signal r(t) with a preset attack detection threshold δ and may determine the stability of the physical system 110 by comparing a preset state variable x(t) with a preset safety determination threshold M in response to the physical system 110.

In detail, when the condition $\|r_1(t)\|_2 > \delta$ or $\|r_2(t)\|_2 > \delta$ is satisfied with respect to an attack detection signal $r_1(t)$ in a normal mode (NC) mode, an attack detection signal $r_2(t)$ and an attack detection threshold δ (δ being a positive constant) in an attack detection control (ADC) mode, the attack detector 140 may determine that there has been an attack and may output an alarm.

When the condition $\|x(t)\|_2 \leq M$ is satisfied with respect to the state variable x(t) and the safety determination threshold M (M being a positive constant) of the physical system 110, the attack detector 140 may determine that the physical system 110 is safe.

For example, the attack detection threshold δ may be predetermined in consideration of at least one of noise and disturbance of the cyber-physical system 100, the safety determination threshold M may be predetermined in consideration of at least one of stability and a physical safe area of the cyber-physical system 100.

The mode controller 130 according to an embodiment may receive the sensor signal $\tilde{y}(t)$ and may output an input control signal u(t) for controlling the physical system 110 based on the received sensor signal $\tilde{y}(t)$.

The mode controller 130 according to an embodiment may control a normal control (NC) mode and an attack detection control (ADC) mode for detecting pole-dynamics attack (PDA) from the outside to be repeatedly executed at a preset switching period.

The pole-dynamics attack is an attack that makes $\tilde{y}(t)$ stay at 0 or a follow target output $y_{ref}(t)$ by adding the attack signal a(t) to y(t) even if the physical system operates unstably and an effect thereof appears in y(t), and that is, a fatal sensor attack that tricks an unstable physical system into appearing to be stable.

In order to calculate the pole-dynamics attack, an accurate model and an initial state value of the physical system 110 need to be given to an attacker, and if this condition is not satisfied, the pole-dynamics attack may be detected through $\tilde{y}(t)$ and r(t).

For example, the mode controller 130 may include an NC mode controller for controlling an NC mode and an ADC mode controller for controlling an ADC mode, but is not limited thereto, and the NC mode and the ADC mode may also be controlled by a single control device.

The attack detector 140 may include an NC mode attack detector operated in the NC mode and an ADC mode attack detector operated in the ADC mode, but is not limited thereto, and the attack detector 140 may also be embodied as a single attack detection device.

According to an aspect, the secret entity 120 may be provided on a feedback line connecting an input end and an output end of the physical system 110 and may be activated in the ADC mode.

According to an aspect, the secret entity 120 may receive the sensor signal $\tilde{y}(t)$ and may output a control input signal $u_f(t)$ obtained by performing calculation of a predetermined design coefficient F on the received sensor signal $\tilde{y}(t)$.

That is, the secret entity 120 may feedback the input signal $u_f(t)$ that is activated and calculated in the ADC mode to the input end of the physical system 110, and the physical system 110 may receive the control input signal obtained by summing the input control signal $u_2(t)$ output from the mode controller 130 in the ADC mode and the calculated input signal $u_f(t)$ output from the secret entity 120.

In detail, in order to calculate the pole-dynamics attack, the accurate model and the initial state value of the physical system 110 need to be given to an attacker. If this condition is not satisfied, the pole-dynamics attack may be detected through $\tilde{y}(t)$ and r(t).

Based on the aforementioned characteristics of the pole-dynamics attack, the cyber-physical system 100 according to an embodiment may periodically switch between multiple control modes to successfully detect a pole-dynamics attack that was not capable of being detected until now.

In more detail, even if the pole-dynamics attack is applied, the cyber-physical system 100 may not detect the attack in the NC mode and may easily detect the applied pole-dynamics attack in the ADC mode.

In the ADC mode, the cyber-physical system 100 may further include the secret entity 120 in the form of sensor output feedback differently from the NC mode, and depending on presence of the secret entity 120, the mode controller 130 and the attack detector 140 in the two modes may have different parameters.

The cyber-physical system 100 may execute a basic operation of a control system in the NC mode, may be switched to the ADC mode for a while at a predetermined period to check presence of a sensor attack, and may then be switched back to the NC mode.

Here, in the NC mode, the attack may not be detected but existence of the ADC mode may be hidden from the attacker.

Because the secret entity 120 accesses the physical system through a channel separated from a network, the attacker may not be capable of accessing the physical system and may not be capable of knowing existence thereof.

That is, in order to successfully attack the control system during the ADC mode, the attacker needs to know a dynamic model to ỹ(t) from u(t) including a model of SE (e.g., a preset design coefficient F), but this is an impossible condition, and thus an effect of the pole-dynamics attack is revealed in ỹ(t), the cyber-physical system 100 may achieve $\|r_2(t)\|_2 > \delta$ and may detect the attack.

The mode controller 130 may control at least one of a switching period of the NC mode and a switching period of the ADC mode.

In detail, when the pole-dynamics attack is applied during the NC mode, if the NC mode is executed for a very long time, the pole-dynamics attack may not be detected and simultaneously the physical system may be seriously damaged. Thus, the mode controller 130 needs to consider a maximum value $\overline{T}$ of a switching period $T_1$ of the NC mode for rapidly switching to the ADC mode.

Even if the ADC mode is executed, it may be necessary to prevent the ADC mode from being too quickly switched to the NC mode before the attack is detected. Thus, the mode controller 130 needs to be consider a minimum value $\underline{T}$ of a switching period of the ADC mode.

According to an aspect, the mode controller 130 may control the switching period of the NC mode based on the maximum value of the switching period of the NC mode that is inversely proportional to the safety determination threshold M.

In detail, the mode controller 130 may control the switching period of the NC mode based on the maximum value of the switching period of the NC mode calculated using Expression 1 below.

$$\overline{T} = \frac{1}{\lambda_u} \ln\left(\frac{\|C\|M}{v_u \delta}\right) \quad \text{[Expression 1]}$$

Here, $\overline{T}$ is a maximum value of the switching period of the NC mode, $v_u$ and $\lambda_u$ are constants that satisfy a condition $\|e^{At}\| \leq v_u e^{\lambda_u t}$, $\delta$ is an attack detection threshold, M is a safety determination threshold, and A and C mean system matrices constituting a linear model corresponding to the physical system.

According to an aspect, the mode controller 130 may control the switching period of the ADC mode based on the minimum value $\underline{T}$ of the switching period of the ADC mode that is inversely proportional to the design coefficient F of the secret entity 120.

In detail, the mode controller 130 may control the switching period of the ADC mode based on the minimum value of the switching period of the ADC mode calculated using Expression 2 below.

$$\underline{T} = \frac{1}{\lambda_u} \ln\left(1 + \frac{\lambda_{d,2} + \lambda_u}{v_{d,2} v_u \|BFC\|}\right) < T_2 \quad \text{[Expression 2]}$$

Here, $\underline{T}$ is a minimum value of the switching period of the ADC mode, $v_u$, $\lambda_u$, $v_{d,2}$, and $\Delta_{d,2}$ are constants that satisfy $\|e^{At}\| \leq v_u e^{\lambda_u t}$ and $\|e^{A_{d,2}t}\| \leq v_{d,2} e^{-\lambda_{d,2}t}$, F is a design coefficient, and B and C mean system matrices constituting a linear model corresponding to the physical system.

According to an aspect, the mode controller 130 may control the switching period of the NC mode and the switching period of the ADC mode to satisfy Expression 3 below and thus may ensure the stability of the cyber-physical system 100.

$$T_2 > \frac{1}{\lambda_2}(\ln(v_1 v_2) - \lambda_1 T_1) \quad \text{[Expression 3]}$$

Here, $T_1$ is a switching period of an NC mode, $T_2$ is a switching period of an ADC mode, $v_i$ and $\Delta_i$ (i being 1 or 2) mean a constant that satisfies a condition $\|e^{\lambda_i t}\| \leq v_i e^{-\lambda_i t}$.

Figure 2:
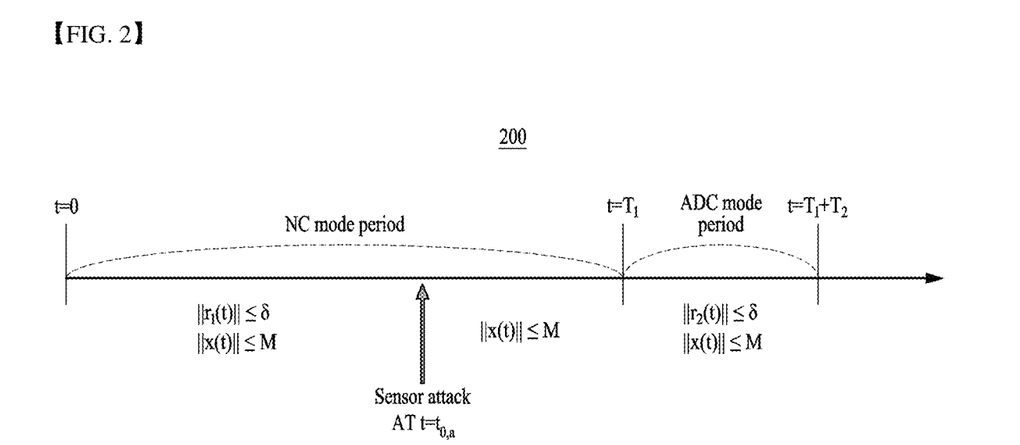
FIG. 2 is a diagram for explaining an example in which a cyber-physical system detects an attack through control mode switching according to an embodiment.

FIG. 2 is a diagram for explaining an example in which a cyber-physical system detects an attack through control mode switching according to an embodiment.

Referring to FIG. 2, reference numeral 200 is a timing diagram according to control mode switching of a cyber-physical system according to an embodiment.

As seen from reference numeral 200, the cyber-physical system may normally operate a system in the NC mode, may be switched to the ADC mode for a while to determine whether the PDA is present, and may then be switched back to the NC mode. Here, $T_1$ is a switching period of an NC mode, and $T_2$ is a switching period of an ADC mode.

When an attack is not applied during the NC mode ($t \leq t_{0,a}$), the cyber-physical system may determine that there is no attack ($\|r_1(t)\|_2 \leq \delta$) and that the physical system is safe ($\|x(t)\|_2 \leq M$).

Then, after the pole-dynamics attack is applied ($t > t_{0,a}$), the cyber-physical system operated in the NC mode may not be capable of detecting the pole-dynamics attack, and $\|x(t)\|_2$ may increase while continuously satisfying $\|r_1(t)\|_2 \leq \delta$.

In this case, the cyber-physical system may switch a control mode to the ADC mode at time $t = T_1$ before $\|x(t)\|_2 > M$ is satisfied, and after the control mode is switched to the ADC mode, an effect of the pole-dynamics attack may be revealed in ỹ(t) and $r_2(t)$, and the cyber-physical system may detect the attack ($\|r_2(t)\|_2 > \delta$).

Figure 3:
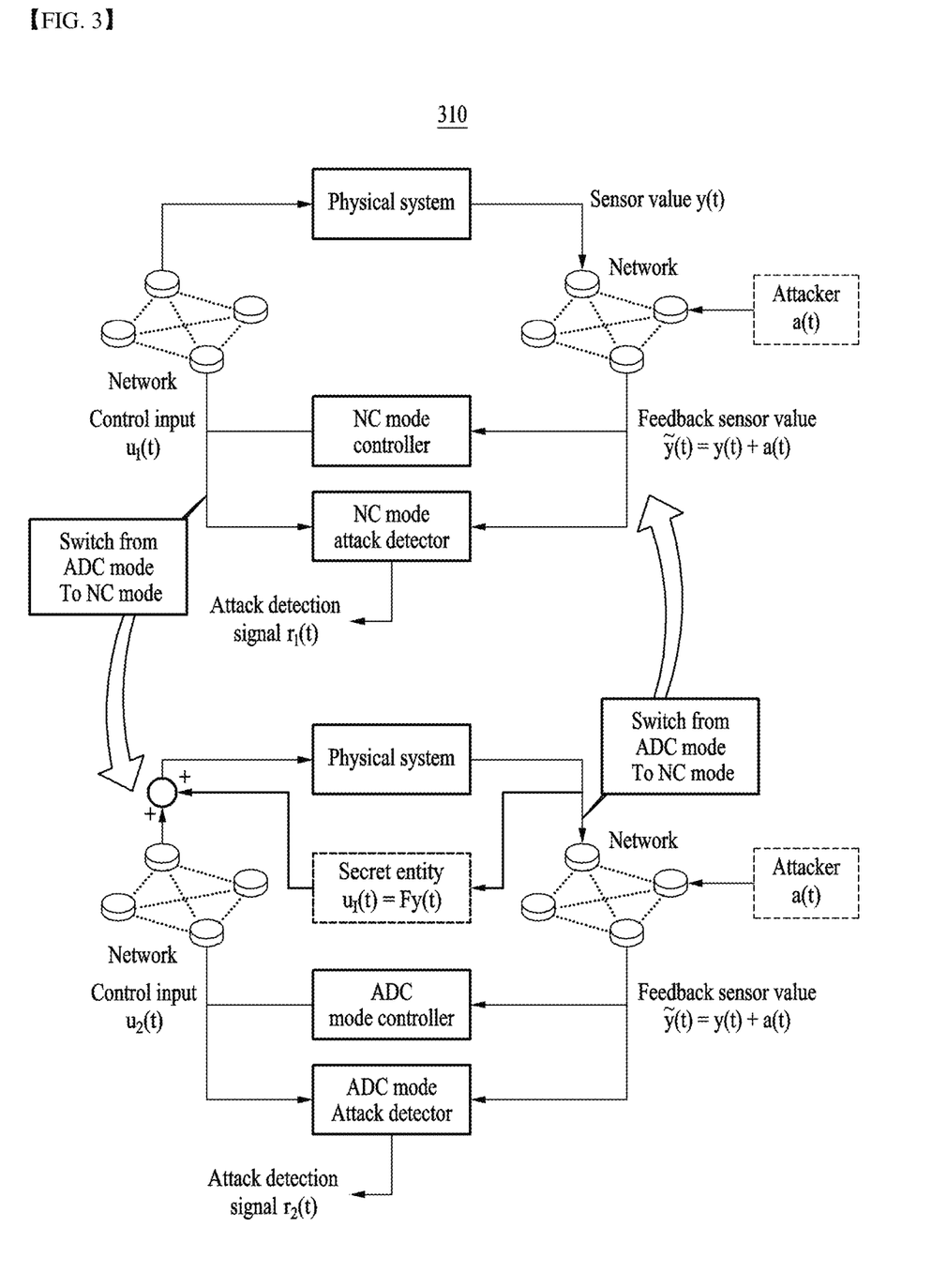
FIG. 3 is a diagram for explaining an example of a cyber-physical system according to an embodiment.

FIG. 3 is a diagram for explaining an example of a cyber-physical system according to an embodiment.

In other words, FIG. 3 is a diagram for explaining an example of the cyber-physical system according to an embodiment described above with reference to FIGS. 1 and 2, and with regard to the following description of FIG. 3, a repeated description of the description given above with reference to FIGS. 1 and 2 will be omitted.

Referring to FIG. 3, a model having linearity of the physical system according to an embodiment may be expressed using Expression 4 below.

$$\dot{x}(t) = Ax(t) + Bu(t),$$

$$y(t) = Cx(t), \quad \text{[Expression 4]}$$

Here, $x(t) \in \mathbb{R}^{n_x}$ is a state of a physical system, $y(t) \in \mathbb{R}$ is a sensor measurement value, and $u(t) \in \mathbb{R}$ is a control input.

Here, the system matrices A and C may be assumed to satisfy an observable condition. This may be a system condition required to design an attack detector based on state estimation.

A linear mode controller model of each mode may be expressed in Byrnes-Isidori normal form using Expression 5 below.

$$\dot{z}_i(t) = S_i z_i(t) + G_i C_{v_i} \eta_i(t),$$

$$\dot{\eta}_i(t) = A_{v_i} \eta_i(t) + B_{v_i}(\phi_i^T \eta_i(t) + \psi_i^T z_i(t) + g_i \tilde{y}(t)),$$

$$u_i(t) = C_{v_i} \eta_i(t), \quad \text{[Expression 5]}$$

In this case, $z_i(t) \in \mathbb{R}^{n_{z,i}}$ and $\eta_i(t) \in \mathbb{R}^{v_i}$ mean a state variable of the linear mode controller. In addition, an indicator i=1 means an NC mode, and i=2 means an ADC mode.

An indicator $v_i$ is a relative degree of an i mode controller, and when a controller is strictly proper, $v_i \geq 1$ may be satisfied.

It may be assumed that a degree of the mode controller is $v_i + n_{z,i}$ and mode controllers of respective modes have the same degree (i.e., $v_1 + n_{z,1} = v_2 + n_{z,2}$). A variable $\tilde{y}(t) \in \mathbb{R}$ means a sensor measurement value fed back through a network. That is, when there is a sensor attack a(t), this may be represented by $\tilde{y}(t) = y(t) + a(t)$.

System matrices $A_{v_i}, B_{v_i}, C_{v_i}$ may be defined by and $$A_{v_i} = \begin{bmatrix} 0_{v_i-1} & I_{v_i-1} \\ 0 & 0^T_{v_i-1} \end{bmatrix}, B_{v_i} = \begin{bmatrix} 0_{v_i-1} \\ 1 \end{bmatrix},$$

and $C_{v_i} = [1 \ 0_{v_i-1}^T]$, and here, $0_{v_i-1} \in \mathbb{R}^{v_i-1}$ is a zero vector, and $I_{v_i-1} \in \mathbb{R}^{(v_i-1) \times (v_i-1)}$ is a unit matrix.

As shown in reference numeral 310, the cyber-physical system may include a secret entity in an ADC mode for detecting the pole-dynamics attack, and the secret entity may be connected to input/output of the physical system through an independent channel from a network infiltrated by an attacker, and accordingly, the attacker may not be capable of accessing the secret entity and may not be capable of knowing existence of the secret entity.

In other words, existence of the secret entity may not be given to the attacker, the secret entity may reveal the pole-dynamics attack in $\tilde{y}(t)$ to lose stealth during the ADC mode, and as a result, the pole-dynamics attack may be detected.

According to an aspect, the secret entity may be defined using Expression 6 below.

$$u_f(t) = Fy(t) \quad \text{[Expression 6]}$$

Here, $F \in \mathbb{R}$ is a design coefficient of a secret entity, and therethrough, a control input signal in an NC mode may be defined by $u(t) = u_1(t)$ and a control input signal in an ADC mode may be defined by $u(t) = u_2(t) + u_f(t)$.

With respect to a vector $x_i(t) = [x(t); z_i(t); \eta_i(t)]$, a closed-loop system model formed by integrating the system of Expressions 4 to 6 above may be represented using Expression 7 below.

$$\dot{x}_i(t) = A_i x_i(t) + B_i a(t),$$

$$\tilde{y}(t) = C x_i(t) + a(t), \quad \text{[Expression 7]}$$

Here, matrices $A_i$, $B_i$, and $C_i$ may be defined by $$A_i = \begin{bmatrix} \overline{A_i} & 0 & BC_{v_i} \\ 0 & S_i & G_i C_{v_i} \\ g_i B_{v_i} C & B_{v_i} \psi_i^T & A_{v_i} + B_{v_i} \phi_i^T \end{bmatrix}, B_i = \begin{bmatrix} 0 \\ 0 \\ g_1 B_1 \end{bmatrix},$$

and $C_i = [C \ 0 \ 0]$, respectively, and in this case, $\overline{A}_1 = A - \overline{A}_2 + A + BFC$, and $A_1$ and $A_2$ may be Hurwitz.

An attack detection model of the attack detector based on state estimation of a physical system may be represented using Expression 8 below.

$$\dot{\hat{x}} = A_{d,1} \overline{x}_i(t) + B u_i(t) + L_i \tilde{y}(t),$$

$$r_i(t) = -C \hat{x}_i(t) + \tilde{y}(t), \quad \text{[Expression 8]}$$

Here, $\hat{x}(t) \in \mathbb{R}^{n_x}$ is a state estimation value of a physical system, and $r_i(t) \in \mathbb{R}$ is an attack detection signal of each mode.

Matrix $L_i$ may be designed in such a way that $A_{d,1} = A - L_1 C$ and $A_{d,2} = A + BFC - L_2 C$ are Hurwitz for each mode.

The attack detector may determine that the pole-dynamics attack is applied when a condition $\|r_i(t)\| > \delta$ is satisfied with respect to a positive constant $\delta$.

The cyber-physical system according to an embodiment may have an issue in terms of a minimum switching period of each mode for ensuring the stability of an entire system according to control mode switching.

Thus, the mode controller according to an embodiment may control the switching periods $T_1$ and $T_2$ of the respective modes in consideration of Expression 3 for a condition for stability.

In detail, an initial state $z_1(NT)$, $\eta_1(NT)$, $\hat{x}_1(NT)$ of the systems of Expressions 5 and 8 may be reset to a state $z_2(NT)$, $\eta_2(NT)$, $\hat{x}_2(NT)$ of the lastly updated ADC mode for all initial times t=NT, N>0 of the NC mode and may be reset to a state $z_1(NT+T_1)$, $\eta_1(NT+T_1)$, $\hat{x}_1(NT+T_1)$ of the lastly updated NC mode for all initial times t=NT+T$_1$ of the ADC mode, and Expression 3 about a condition for stability may be derived based on this operation.

When a model (model of the physical system) of Expression 1 above is assumed to be given to an attacker, the pole-dynamics attack using the model may be represented using Expression 9 below.

$$\dot{x}^a(t) = A x^a(t),$$

$$a(t) = -C x^a(t) \quad \text{[Expression 9]}$$

Here, $x^a(t) \in \mathbb{R}^{n_x}$ may refer to a state variable of the pole-dynamics attack, and an initial state $x^a(t_{0,a})$ may be determined as a value that satisfies a condition $\overline{x}_u^a(t_{0,a}) \neq 0$. In this case, $\overline{x}_u^a(t_{0,a})$ may be represented using Expression 10 below.

$$A = [V_u \ V_s] \begin{bmatrix} \Lambda_u & 0 \\ 0 & \Lambda_s \end{bmatrix} [V_u \ V_s]^{-1}, \quad \text{[Expression 10]}$$

$$\overline{x}^a(t) := [\overline{x}_u^a; \ \overline{x}_s^a]$$

$$= [V_u \ V_s]^{-1} x^a(t),$$

Here, all eigen values of a matrix $\Lambda_s$ may have a negative real part (i.e., a stable mode), and all eigen values of a matrix $\Lambda_u$ may have a positive real part (i.e., an unstable mode). In addition, $V_s$ and $V_u$ may be eigen vectors of $\Lambda_s$ and $\Lambda_u$, respectively.

In order to easily analyze an effect of the pole-dynamics attack, the pole-dynamics attack calculated from Expressions 9 and 10 may be assumed to be applied when the cyber-physical system according to an embodiment is in a normal state. That is, with respect to an attack initial time t=$t_{0,a}$, conditions $x_i(t_{0,a})=0$ and $\hat{x}(t_{0,a})=0$ may be satisfied.

Then, an error model of Expression 11 below may be derived by integrating the closed-loop system models (Expressions 7, 9, and 10) of the NC mode with respect to an error vector $\tilde{x}(t) = x(t) - x^a(t)$.

$$\dot{\tilde{x}}_1(t) = A_1 \tilde{x}_1(t),$$

$$\tilde{y}(t) = C \tilde{x}_1(t). \quad \text{[Expression 11]}$$

A system based on Expression 11 may have the same model as Expression 7 without attack and $A_1$ may be set to be Hurwitz. Accordingly, the system of Expression 11 may also be considered as a stable system, and a solution to Expression 11 may be represented as Expression 12 below.

$$\|[\tilde{x}(t); z_1(t); \eta_1(t)]\| \leq k_e e^{-l_e t} \|x^a(t_{0,a})\| \quad \text{[Expression 12]}$$

Here, $k_e$ and $l_e$ are positive constants and Expression 12 means $\tilde{x}(t) \to 0$ for $t \to \infty$.

That is, due to $x^a(t) \to \infty$ from Expressions 9 and 10, the physical system may be unstably operated based on $x(t) \to \infty$.

$\tilde{x}(t) \to 0$ means $\tilde{y}(t) \to 0$. That is, the instability information of the physical system may not be observed in feedback sensor output, which may be associated with the stealth of the pole-dynamics attack.

When a new error vector is defined by $\zeta_1(t) = \tilde{x}(t) - \tilde{x}_1(t)$, an attack detection error model of Expression 13 below may be acquired by integrating the systems of Expressions 4, 8, and 9 and $\zeta_1(t)$.

$$\dot{\zeta}_1(t) = A\tilde{x}(t) - A_{d,1}\hat{x}_1(t) - L_1\tilde{y}(t) \qquad \text{[Expression 13]}$$
$$= A_{d,1}\zeta_1(t),$$
$$r_1(t) = C\zeta_1(t).$$

Since the system of Expression 13 may have the same system matrix $A_{d,1}$ as Expression 8 and $A_{d,1}$ is Hurwitz, the system of Expression 13 may be determined to be safe. In this regard, $\|\zeta_1(t)\|$ may be represented using Expression 14 below.

$$\|r_1(t)\| = \|Ce^{A_{d,1}(t-t_{0,a})}\zeta_1(t_{0,a})\|$$
$$\leq v_{d,1}\|C\|\|x^a(t_{0,a})\|e^{-\lambda_{d,1}(t-t_{0,a})}$$
$$\leq v_{d,1}\|C\|\|x^a(t_{0,a})\|, \qquad \text{[Expression 14]}$$

Here, $v_{d,1}$ and $\lambda_{d,1}$ may refer to positive constants that satisfy a condition $\|e^{A_{d,1}t}\| \leq v_{d,1}e^{-\lambda_{d,1}t}$.

As seen from Expression 14, the size of $\|r_1(t)\|$ may be determined by $\|x^a(t_{0,a})\|$. That is, attack detection during NC mode operation may be avoided by selecting a sufficiently small value for the attacker.

In order to explaining a pole-dynamics attack detection operation in the ADC mode, a new error vector $\zeta_2(t) = \tilde{x}(t) - \hat{x}_2(t)$ may be defined. An attack detection error model in the ADC mode shown in Expression 15 below may be acquired by integrating the system of Expressions 4, 6, 8, and 9 and $\zeta_2(t)$.

$$\dot{\zeta}_2(t) = A_{d,2}\zeta_2(t) + BFCx^a(t),$$
$$r_2(t) = C\zeta_2(t), \qquad \text{[Expression 15]}$$

Here, a matrix $A_{d,2}$ may be Hurwitz. That is, a stable system having $FCx^a(t)$ as input and $r_2(t)$ as output may be acquired.

A state $x^a(t)$ may satisfy $x^a(t) \to \infty$ according to Expressions 9 and 10 and may be input to Expression 15 in proportion to a design factor F. As a result, a path of $x^a(t)$ may be revealed in $\zeta_2(t)$ and $r_2(t)$, which may make $\|r_2(t)\| > \delta$ and may detect the pole-dynamics attack.

The mode controller may control the switching period $T_1$ of the NC mode based on the maximum value $\overline{T}$ of the switching period $T_1$ of the NC mode calculated through Expression 1 above.

In detail, as seem from Expressions 11 to 14, when the pole-dynamics attack is applied during the NC mode, an unstable trajectory in $x(t)$ may not be observed in r1(t). Needless to say, when the NC mode is switched to the ADC mode, an attack may be detected, but this case may correspond to a point in time after the physical system is destroyed.

That is, the NC mode needs to be switched to the ADC mode before $x(t)$ enters an unsafe area due to the PDA during the NC mode, and thus the mode controller may control the switching period $T_1$ of the NC mode using an optimized maximum value $\overline{T}$ through Expression 1.

In more detail, $x(t)$ of the physical system to which the pole-dynamics attack is applied during the NC mode from Expressions 11 and 12 may converge on $x^a(t)$ of the attacker. Thus, a safe state condition $\|x(t)\| \leq M$ of the physical system may be replaced with $\|x^a(t)\| \leq M$ and may be evaluated by applying $x^a(t)$ of the attacker. The solution of the attacker model of Expression 9 above may be represented using Expression 16 below.

$$\|x^a(t)\| = \|e^{A(t-t_{0,a})}x^a(t_{0,a})\|$$
$$\leq v_u e^{\lambda_u(t-t_{0,a})}\|x^a(t_{0,a})\| \qquad \text{[Expression 16]}$$

An inequality of Expression 17 below may be acquired via integration with the safe state condition $\|x^a(t)\| \leq M$ replaced in Expression 16.

$$e^{\lambda_u(t-t_{0,a})} \leq \frac{M}{v_u\|x^a(t_{0,a})\|} \qquad \text{[Expression 17]}$$

Here, an inequality of Expression 18 below may be acquired when $t - t_{0,a} \leq T_1$ is satisfied and a natural logarithm is applied to both sides of Expression 17.

$$T_1 \leq \frac{1}{\lambda_u}\ln\left(\frac{M}{v_u\|x^a(t_{0,a})\|}\right) \qquad \text{[Expression 18]}$$

Here, $\|x^a(t_{0,a})\|$ refers to an initial state value of a pole-dynamics attack Here, designed by an attacker. For stealth of the pole-dynamics attack, $\|x^a(t_{0,a})\|$ needs to be less than $\delta/\|C\|$ in Expression 14, and Expression 1 for calculating the maximum value $\overline{T}$ of the switching period $T_1$ of the NC mode may be derived by applying $\|x^a(t_{0,a})\|$ to Expression 18.

As seen from Expression 1, the size of $\overline{T}$ may be proportional to M. This means that when the size of the safety determination threshold M is set to be large, more attack effects are allowed on the physical system during the NC mode, and thus the range of selection of the switching period $T_1$ of the NC mode is also increased.

According to an aspect, the mode controller may control the switching period $T_2$ of the ADC mode based on the minimum value $\underline{T}$ of the switching period $T_2$ of the ADC mode calculated through Expression 2 above.

In detail, the fact that the effect of the pole dynamic-attack during the ADC mode is revealed in $r_2(t)$ is proved through Expression 15, but this may not mean that the attack is always detected. This is because, when $T_2$ is too small, a control mode is switched to the NC mode before the pole-dynamics attack is detected, and thus a response to the attack may fail.

Thus, the mode controller may control the switching period $T_2$ of the ADC mode using the optimized minimum $\underline{T}$ through Expression 2.

In more detail, a solution to an error model of Expression 15 may be represented as Expression 19 below.

$$r_2(t) = Ce^{A_{d,2}(t-(NT+T_1))}\zeta_2(NT+T_1) + \int_{NT+T_1}^{t}Ce^{A_{d,2}(t-\tau)}BFCx^a(\tau)d\tau \qquad \text{[Expression 19]}$$

Here, a matrix $A_{d,2}$ may be Hurwitz, and $\zeta_2(NT+T_1)=0$ may be considered from Expressions 11 and 13, and thus Expression 19 may be simplified as Expression 20 below.

$$r_2(t)=\int_{NT+T_1}^{t} Ce^{A_{d,2}(t-\tau)}BFCx^a(\tau)d\tau \quad \text{[Expression 20]}$$

An inequality of Expression 21 below may be acquired by applying $\|.\|$ to both sides of Expression 20 and inserting $\|e^{A\tau}\| \leq v_u e^{\lambda_u(\tau-(NT+T_1))}$, $\|e^{A_{d,2}(t-\tau)}\| \leq v_{d,2} e^{-\lambda_{d,2}(t-\tau)}$, and $e^{-\lambda_{d,2}(t-(NT+T_1))} \leq 1$.

$$\|r_2(t)\| = \left\| \int_{NT+T_1}^{t} Ce^{A_{d,2}(t-\tau)}BFCx^a(\tau)d\tau \right\| \leq \quad \text{[Expression 21]}$$

$$\frac{v_{d,2} v_u \|C\| \|BFC\|}{\lambda_{d,2}+\lambda_u} \times (e^{\lambda_u(t-(NT+T_1))}-1)\|x^a(NT+T_1)\|$$

Expression 22 may be derived by detecting the pole-dynamics attack until $\|r_2(t)\| > \delta$ and applying this to Expression 21, an initial value $\|x^a(NT+T_1)\|$ of the pole-dynamics attack in Expression 22 needs to be smaller than $\delta/\|C\|$ for stealth, and by applying this, Expression 23 may be derived.

$$1+\frac{\lambda_{d,2}+\lambda_u}{v_{d,2}v_u\|BFC\|}\frac{\delta}{\|C\|\|x^a(NT+T_1)\|} < e^{\lambda_u(t-(NT+T_1))} \quad \text{[Expression 22]}$$

$$1+\frac{\lambda_{d,2}+\lambda_u}{v_{d,2}v_u\|BFC\|} < e^{\lambda_u(t-(NT+T_1))} \quad \text{[Expression 23]}$$

Expression 2 for calculating the minimum value $\underline{T}$ of the switching period $T_2$ of the ADC mode may be finally derived by applying a natural logarithm to both sides of Expression 23.

As seen from Expression 2 above, $\underline{T}$ may be inversely proportional to the design coefficient F of the secret entity, and F having a large value means that it is possible to more rapidly detect the pole-dynamics attack during the ADC mode.

The cyber-physical system according to an embodiment may also easily detect and respond to a robust pole-dynamics attack (RPDA).

The robust pole-dynamics attack may refer to a sensor attack that inflicts as much damage upon the cyber-physical system while maintaining stealth even if system model information possessed by the attacker is inaccurate and may further require inaccurate models (here, a system degree requires accurate information) of Expressions 4 and 5 compared with the pole-dynamics attack and real-time eavesdropping of u(t).

In detail, with regard to the robust pole-dynamics attack in the NC mode, the mode controller of each mode (which corresponds to Expression 5) may be assumed to have $z_i(t), \eta_i(t)$ in the same dimension, and a general model of Expressions 4 and 5 processed by the attacker may be represented by Expression 24 below using a subscript n. Here, $v_1 = v_2, n_{z,1} = n_{z,2}$ may be satisfied and will be expressed by $v$, $n_z$ hereinafter.

$$\dot{x}_n(t)=A_n x_n(t)+B_n(t),$$

$$\dot{z}_n(t)=S_n z_n(t)=G_n u_n(t),$$

$$\dot{\eta}_n(t)=(A_v+B_v\phi_n^T)\eta_n(t)+B_v(\psi_n^T z_n(t)+g_n C_n x_n(t)),$$

$$u_n(t)=C_v\eta_n(t), \quad \text{[Expression 24]}$$

In this case, Expression 24 may be considered as a stable closed-loop system, and when is $\|x(t_f)\| > M$ is satisfied while $\|\tilde{y}(t)-C_n x_n(t)\| \leq \delta$ is satisfied under a stealth condition for a finite time range $t \in [t_{0,a}, t_f]$, the robust pole-dynamics attack may be evaluated to be successful. The robust pole-dynamics attack and the pole-dynamics attack have different stealth conditions, but may be considered to have the same meaning in that an attack effect revealed in $\tilde{y}(t)$ is observed.

From a system based on Expression 24, a first strategy of the robust pole-dynamics attack may be to eavesdrop on $u_1(t)$ in real time to derive a model of Expression 25 below.

$$\dot{x}_n^a(t)=A_n x_n^a(t)+B_n u_1(t)$$

$$\dot{z}_n^a(t)=S_n z_n^a(t)+G_n u_1(t) \quad \text{[Expression 25]}$$

Here, $x_B^a(t) \in \mathbb{R}^{n_x}$ and $z_n^a(t) \in \mathbb{R}^{n_z}$ may be state variables of the robust pole-dynamics attack.

$\eta_1(t)$ of Expression 26 below may be acquired by integrating Expression 25 and Expression 5.

$$\dot{\eta}_1(t)=(A_v+B_v\phi_n^T)\eta_1(t)+B_v(\psi_n^T z_n^a(t)+g_n C_n x_n^a(t))$$

$$u_1(t)=\eta_1(t), \quad \text{[Expression 26]}$$

A variable a*(t) in Expression 26 may be represented by Expression 27 below.

$$a^*(t)=\frac{1}{g_1}(-\psi_1^T z_1(t)+\psi_n^T z_n^a(t)+ \quad \text{[Expression 27]}$$

$$(\phi_n^T-\phi_1^T)\eta_1(t)+g_n C_n x_n^a(t)-g_1 C_x(t))$$

When the attacker calculates the robust pole-dynamics attack using a(t)=a*(t) by calculating Expression 27, a model of $\eta_1(t)$ of Expression 27 may be completely independent from $x(t), z_1(t)$. That is, even if the physical system is unstably operated and an effect of the attack is revealed in x(t), the attack may not be observed by the closed-loop system.

Thus, while the attacker maintains stealth, the physical system may fail to stabilize, but Expression 27 contains model information and a state variable that are not capable of being known to the attacker, and thus this condition may have difficulty in satisfying a condition a(t)–a*(t).

a(t)–a*(t) of Expression 25 has the form of a disturbance for input of the closed-loop system, and thus the issue may be solved by estimating and compensating for a(t)–a*(t) in real time using a control strategy robust to disturbance.

Then, the closed-loop system model to which the robust pole-dynamics attack is applied during the ADC mode may be represented using Expression 28 below.

$$\dot{x}_n^a(t)=A_n x_n^a(t)+B_n u_2(t),$$

$$\dot{z}_n^a(t)=S_n z_n^a(t)+G_n u_2(t),$$

$$\dot{\eta}_2(t)=(A_v+B_v\phi_n^T)\eta_2(t)+B_v(\psi_n^T z_n^a(t)+g_n C_n x_n^a(t))+g_2 B_v(a(t)-a^*(t)),$$

$$u_2(t)=\eta_2(t), \quad \text{[Expression 28]}$$

Here, a variable a*(t) may be obtained by replacing information of the NC mode with a value of the ADC mode in Expression 27, and lastly, an unstable model of Expression 29 below, which is separated from Expression 28, may be acquired.

$$\dot{x}(t)=Ax(t)+B(u_2(t)+Fy(t)),$$

$$\dot{z}(t)=S_2 z_2(t)+G_2 u_2(t). \quad \text{[Expression 29]}$$

As a result, when F has a sufficiently large value and x(t) is unstable in Expression 29, Fy(t) of Expression 29 may act as a huge input signal of the physical system.

Thus, x(t) and a(t) may change drastically to an unbearable extent, and an estimation error of a*(t) may be further maximized depending on the size of F.

Accordingly, the cyber-physical system according to an embodiment may satisfy $\|\tilde{y}(t)-C_n x_n(t)\| > \delta$ before $\|x(t_f)\| > M$ is achieved for a finite time $t \in [t_{0,a}, t_f]$ and may easily detect the robust pole-dynamics attack.

FIGS. 4A to 4H are diagrams for explaining a simulation result for a cyber-physical system according to an embodiment.

Referring to FIGS. 4A to 4H, reference numerals 410 to 440 show simulation results of detection performance of the pole-dynamics attack, and reference numerals 450 to 480 show simulation results of detection performance of the robust pole-dynamics attack.

Figure 4A:
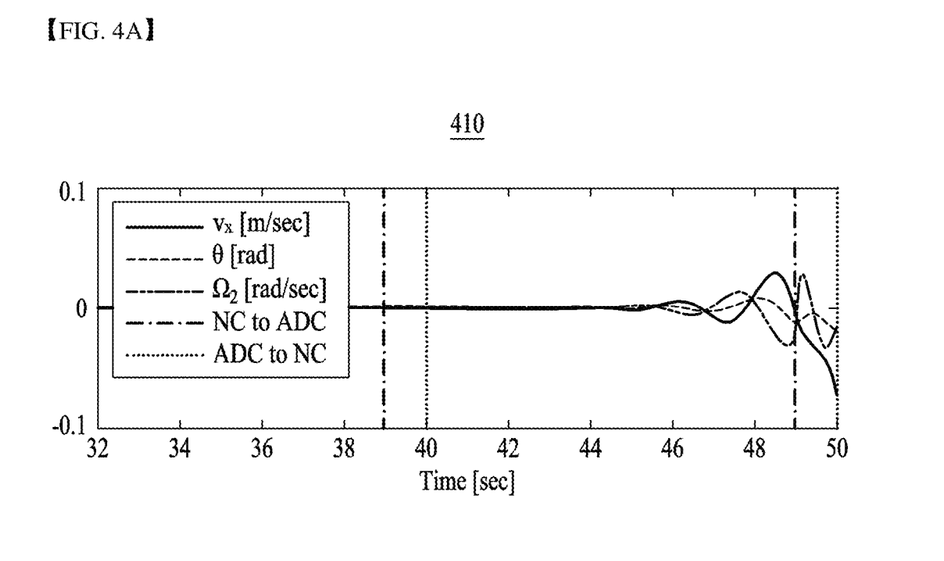
FIGS. 4A to 4H are diagrams for explaining a simulation result for a cyber-physical system according to an embodiment.
Figure 4B:
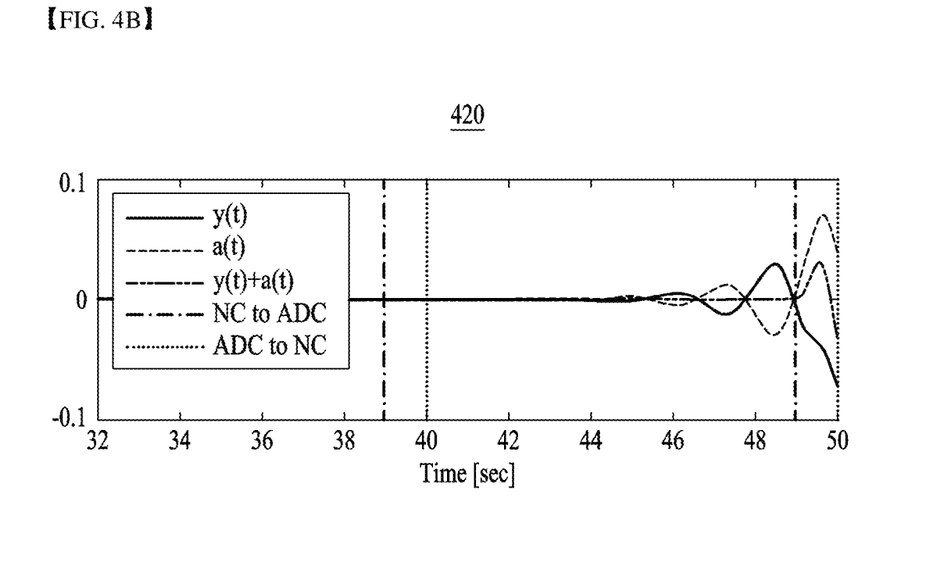

In detail, reference numeral 410 shows a first state path of a quadrotor that is a type of a cyber-physical system, and reference numeral 420 shows the sensor output y(t), the pole-dynamics attack a(t), and the feedback sensor output path ỹ(t) according to the first state path.

Figure 4C:
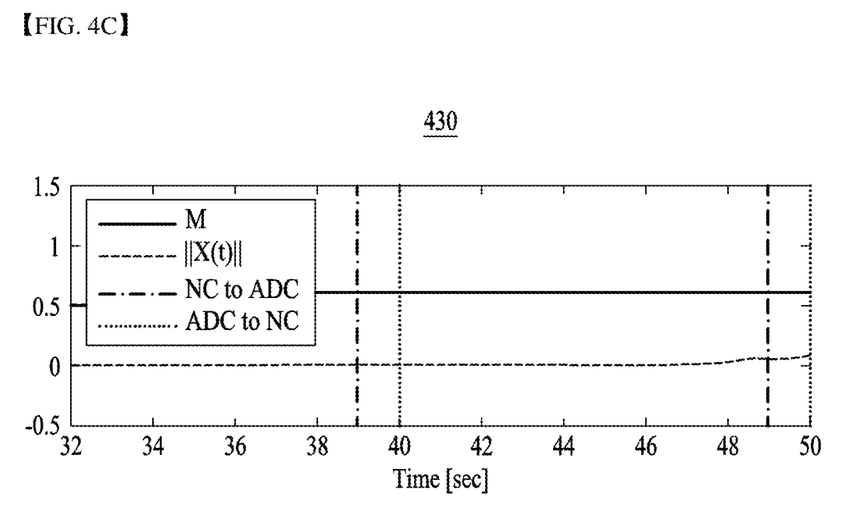
Figure 4D:
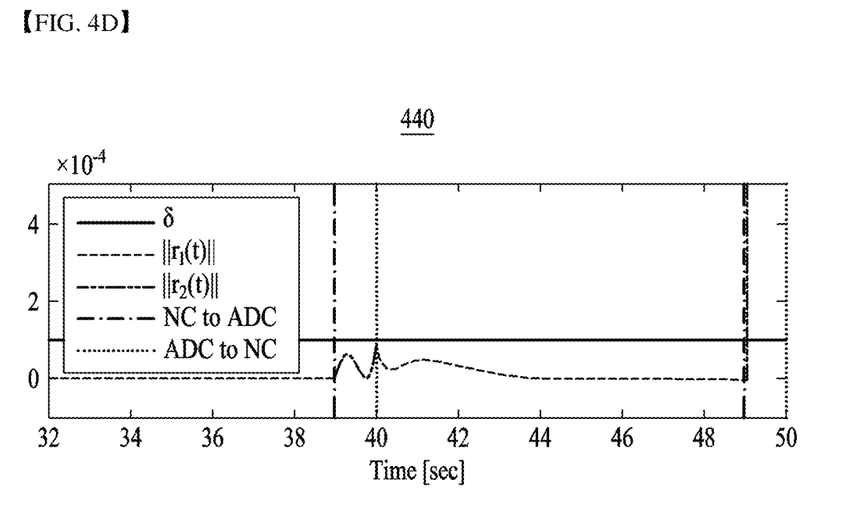

Reference numeral 430 shows a safe state according to the first state path, and reference numeral 440 shows an attack detection signal r(t) in each mode according to the first state path.

Figure 4E:
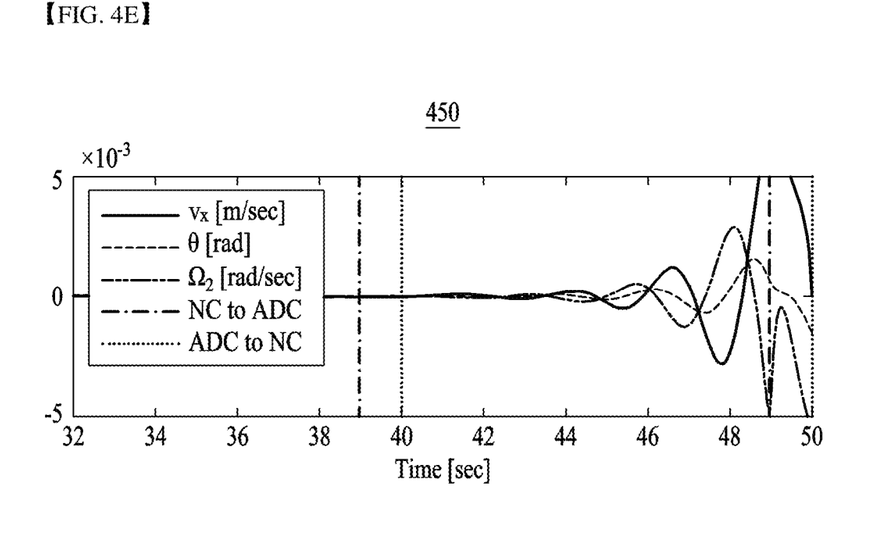
Figure 4F:
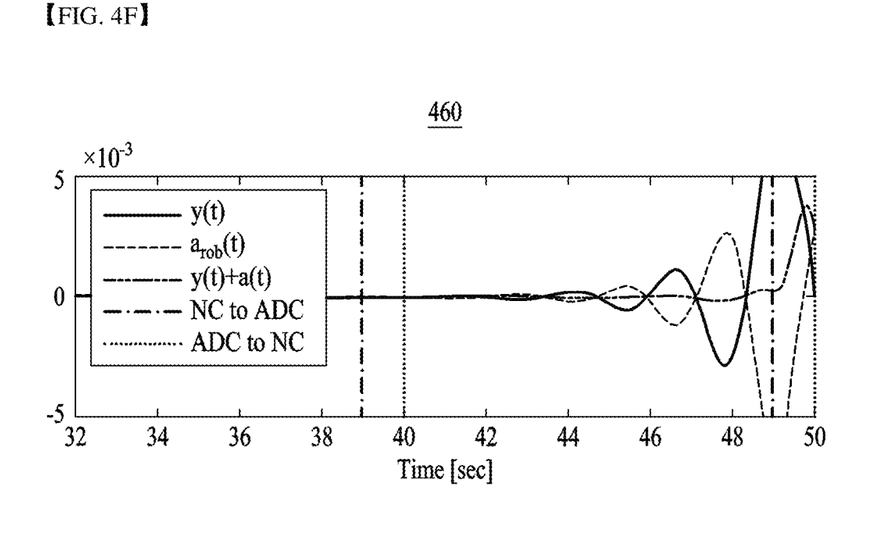

Reference numeral 450 shows a second state path of the quadrotor, and reference numeral 460 shows the sensor output y(t) and the feedback sensor output path ỹ(t) according to the second state path.

Figure 4G:
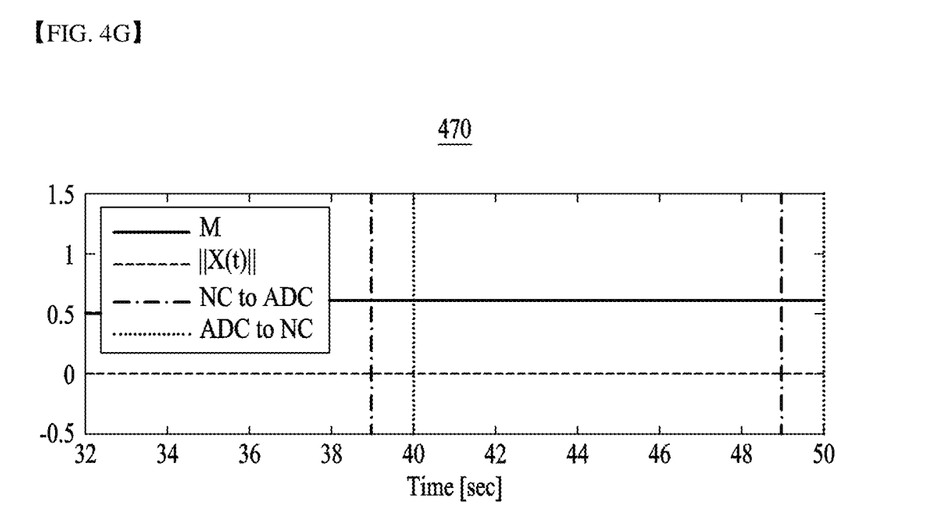
Figure 4H:
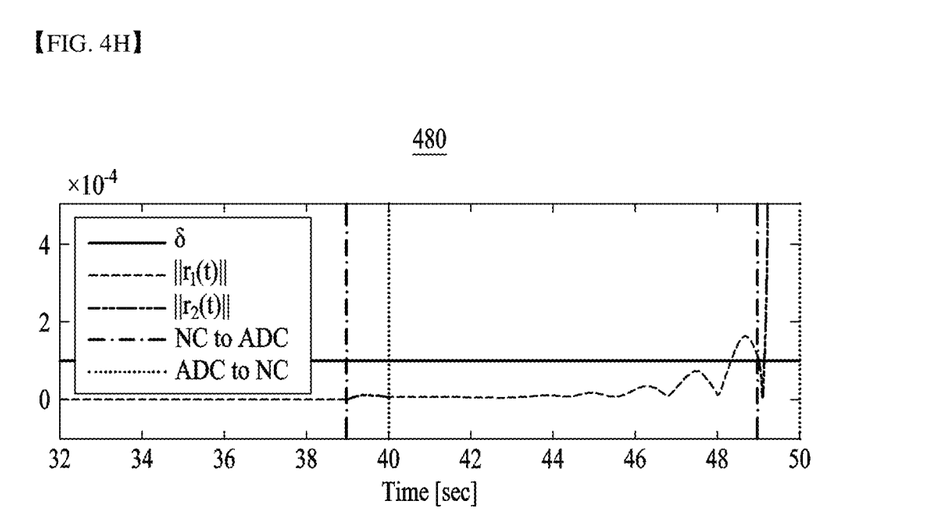

Reference numeral 470 shows a safe state according to the second state path, and reference numeral 480 shows an effect of the robust pole-dynamics attack revealed in an attack detection signal of each mode according to the second state path.

As seen from reference numerals 410 to 440, in a time period t of 39 to 40 seconds, the ADC mode may be executed and simultaneously the pole-dynamics attack may be applied, and a very small attack effect is observed before the ADC mode is switched to the NC mode again at t=40 seconds.

However, an effect of the pole-dynamics attack is obviously revealed in $r_2(t)$ because the secret entity is designed using F that is a sufficiently large value.

In detail, it may be seen that, in a time period of t of 40 to 49 seconds, the quadrotor may be unstably operated and an effect of the attack may be revealed in a state X and the sensor output y(t)=$\Omega_2$. However, it may be seen that ỹ(t) is still in a normal state and $r_1(t)$ converges to 0, and then the control mode is switched to the ADC mode at t=49, and pole-dynamics attack is detected using $\|r_2(t)\| > \delta$ while $\|[v_x; \theta; \Omega_2]\| \leq M$ is satisfied.

As seen from reference numerals 450 to 480, an effect of the robust pole-dynamics attack is also revealed in ỹ(t) during the NC mode, and this may be considered to be due to an underlying limitation of a low-pass filter of DOB.

The effect may also be observed in the attack detection signal, and it may be seen that, even if the NC mode is executed, the robust pole-dynamics attack is detected at t=48.5 seconds.

It may be seen that, after the NC mode is switched to the ADC mode at a time t=49 seconds, the robust pole-dynamics attack may also be detected, and in this case, the quadrotor stays in a safe state area.

As a result, according to the present disclosure, the pole-dynamics attack that was not capable of being detected until now may be successfully detected by executing the multiple control modes.

A stable control environment may be established by detecting the pole-dynamics attack in real time.

According to an embodiment of the present disclosure, the pole-dynamics attack that was not capable of being detected until now may be successfully detected by executing the multiple control modes.

According to the present disclosure, a stable control environment may be established by detecting the pole-dynamics attack in real time.

Although the present disclosure has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

What is claimed is:

1. A cyber-physical system comprising:
a memory configured to store computer-readable instructions: and one or more processors configured to execute the computer-readable instructions such that the one or more processors are configured to,
receive a sensor signal output from a physical system and to output an attack detection signal based on the received sensor signal; and
receive the sensor signal and to output an input control signal for controlling the physical system based on the received sensor signal,
wherein the one or more processors are further configured to control a normal control (NC) mode and an attack detection control (ADC) mode for detecting a pole-dynamics attack (PDA) from an output to be repeatedly executed at a preset switching period.

2. The cyber-physical system according to claim 1,
wherein the one or more processors are further configured to be provided on a feedback line connecting an input end and an output end of the physical system and activated in the ADC mode.

3. The cyber-physical system according to claim 2, wherein the one or more processors are further configured to receive the sensor signal and output a control input signal obtained by performing calculation of a predetermined design coefficient on the received sensor signal.

4. The cyber-physical system according to claim 1, wherein the one or more processors are further configured to determine whether there is an attack on or error in the physical system by comparing the attack detection signal with a preset attack detection threshold and determine stability of the physical system by comparing a preset state variable with a preset safety determination threshold in response to the physical system.

5. The cyber-physical system according to claim 1, wherein the one or more processors are further configured to control at least one of a switching period of the NC mode and a switching period of the ADC mode.

6. The cyber-physical system according to claim 5, wherein the one or more processors are further configured to control the switching period of the NC mode based on a maximum value of the switching period of the NC mode that is inversely proportional to a preset safety determination threshold.

7. The cyber-physical system according to claim 5, wherein the one or more processors are further configured to control the switching period of the NC mode based on a maximum value of the switching period of the NC mode that is calculated through Expression 1 below:

$$T = \frac{1}{\lambda_u} \ln\left(\frac{\|C\|M}{v_u \delta}\right) \quad \text{[Expression 1]}$$

where T is a maximum value of the switching period of the NC mode, $v_u$ and $\lambda_0$ are constants satisfying a condition $\|e\| \leq v_u e^{\lambda_u t}$, $\delta$ is an attack detection threshold, M is a safety determination threshold, and A and C are system matrices constituting a linear model corresponding to the physical system.

8. The cyber-physical system according to claim 5, wherein the one or more processors are further configured to control the switching period of the ADC mode based on a minimum value of the switching period of the ADC mode that is inversely proportional to a preset design coefficient of the secret entity.

9. The cyber-physical system according to claim 5, wherein the one or more processors are further configured to control the switching period of the ADC mode based on a minimum value of the switching period of the ADC mode calculated using Expression 2 below:

$$T = \frac{1}{\lambda_u} \ln\left(1 + \frac{\lambda_{d,2} + \lambda_u}{v_{d,2} v_u \|BFC\|}\right) < T_2 \quad \text{[Expression 2]}$$

where T is a minimum value of the switching period of the ADC mode, $v_u$, $\lambda_u$, $v_{d,2}$, and $\lambda_{d,2}$ and are constants satisfying $\|e^{At}\| \leq v_u e^{\lambda_u t}$ and $\|e^{A_{d,2}t}\| \leq V_{d,2} e^{-\lambda_{d,2}t}$, F is a design coefficient, and B and C are system matrices constituting a linear model corresponding to the physical system.

10. The cyber-physical system according to claim 5, wherein the one or more processors are further configured to control the switching period of the NC mode and the switching period of the ADC mode to satisfy Expression 3 below:

$$T_2 > \frac{1}{\lambda_2}(\ln(v_1 v_2) - \lambda_1 T_1) \quad \text{[Expression 3]}$$

where $T_1$ is the switching period of the NC mode, $T_2$ is the switching period of the ADC mode, and $v_i$ and $\lambda_i$ (i being 1 or 2) are constants satisfying a condition $\|e^{A_i t}\| \leq v_i e^{-\lambda_i t}$.

* * * * *